US012299972B2

(12) United States Patent
Zuniga Zamalloa et al.

(10) Patent No.: US 12,299,972 B2
(45) Date of Patent: May 13, 2025

(54) STEREOSCOPIC CAMERA SYSTEM FOR GEO-REGISTRATION OF 3D RECONSTRUCTED POINTS AND VECTORS

(71) Applicant: The Government of the United States of America, as represented by the Secretary of the Navy, Arlington, VA (US)

(72) Inventors: Carlo C. Zuniga Zamalloa, Slidell, LA (US); Blake J. Landry, Saint Martinville, LA (US); Edward F. Braithwaite, III, Covington, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 484 days.

(21) Appl. No.: 17/497,791

(22) Filed: Oct. 8, 2021

(65) Prior Publication Data

US 2022/0114809 A1    Apr. 14, 2022

Related U.S. Application Data

(60) Provisional application No. 63/089,557, filed on Oct. 9, 2020.

(51) Int. Cl.
| G06V 20/10 | (2022.01) |
| G06T 7/00  | (2017.01) |
| G06T 7/70  | (2017.01) |
| H04W 4/02  | (2018.01) |

(52) U.S. Cl.
CPC ............. *G06V 20/10* (2022.01); *G06T 7/70* (2017.01); *G06T 7/97* (2017.01); *H04W 4/025* (2013.01); *G06T 2207/10028* (2013.01); *G06T 2207/30181* (2013.01)

(58) Field of Classification Search
CPC .. G06V 20/10; G06T 7/97; G06T 7/70; G06T 2207/10028; G06T 2207/30181; G06T 7/246; H04W 4/025
See application file for complete search history.

(56) References Cited

U.S. PATENT DOCUMENTS

| 10,366,500 B2 * | 7/2019 | Zamalloa ............. H04N 13/167 |
| 2019/0005656 A1 * | 1/2019 | Sanghvi .................. G06T 7/251 |

\* cited by examiner

*Primary Examiner* — Wesley J Tucker
*Assistant Examiner* — Courtney Joan Nelson
(74) *Attorney, Agent, or Firm* — US Naval Research Laboratory; Nigel R. Fontenot

(57) ABSTRACT

Systems and methods may include tracking one or a plurality features across a decreasing scale of tiled sets of one or more images. Aspects may include generating point data for each of the tracked features based on a coordinate system relative to the first camera or the second camera, and transforming the point data to a Global Positioning System/Inertial Navigation System (GPS/INS) coordinate system based on (1) an origin of a first GPS device coupled to the first camera and (2) a rotation of the first camera relative to an INS device coupled to the first camera. Aspects may include generating, based on the transformed point data, a geodetic mapping function, determining, based on the geodetic mapping function, georegistered coordinates of the tracked features, using the georegistered coordinates of the tracked features to characterize the water flow.

20 Claims, 12 Drawing Sheets

Geo-Calibration

400

STEREOSCOPIC CAMERA SYSTEM FOR GEO-REGISTRATION OF 3D RECONSTRUCTED POINTS AND VECTORS

CROSS-REFERENCE

This Application is a nonprovisional application of and claims the benefit of priority under 35 U.S.C. § 119 based on U.S. Provisional Patent Application No. 63/089,557 filed on Oct. 9, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case #109643.

TECHNICAL FIELD

The present disclosure is related to a camera system that allows the 3D reconstruction and georegistration of points.

BACKGROUND

Measurements of field-scale flows are required for accurately understanding, modeling and predicting the dynamics in riverine and marine environments. Techniques have been developed to accurately capture the field-scale flow measurements for both typical and hazardous flow conditions. For non-hazardous flows (e.g., non-debris flows or flows without large sediment loads), there are several standard techniques for measuring discharge such as turbine flowmeters and ultrasonic profilers. While ultrasonic meters have been developed to provide precise flow measurements, these meters require substantial installation infrastructure and cannot be rapidly placed for time-critical deployments. In addition, the meters cannot be used in hazardous flow conditions (e.g., violent mudslides, flash floods, or debris flows) due to the high risk of damage to any sensors placed in the flow. Also, the range of operation of such equipment (acoustic clarity in the case of ultrasonic profilers) is not designed for such hazardous events. For such extreme conditions, remote sensing flow measurement techniques are required. Particle Image Velocimetry (PIV) is a widely-use, non-contact, image processing laboratory technique which commonly utilizes cross-correlation of consecutive images via Finite Fourier Transform (FFT). Large Scale Particle Image Velocimetry (LSPIV) extends the laboratory technique using FFT to correlate image pairs in field measurements.

LSPIV typically consists of applying the traditional image correlation via Fast Fourier Transform algorithm used in PIV to field applications for measuring surface water flows. PIV itself is a laboratory technique and requires seeding material (e.g., olive oil mist for air flows and glass spheres for water flows) to create a random speckle pattern in the images so that image subregions can be tracked. The cross-correlation of images can be summarized as the process of taking fixed-sized subregions from an image and using it as a template to find the subregions which are most similar in another image.

A previous patent of some of the current inventors, U.S. Pat. No. 10,366,500, describes an example of feature tracking velocimetry capable of reconstruction scaled 3D point and vector data for non-geodetic coordinates that is scaled to an origin of the system. U.S. Pat. No. 10,366,500 is hereby incorporated by reference in its entirety for all purposes.

Automated Trinocular Stereo Imaging System (ATSIS) provides a wave reconstruction system for field applications where a water wave can be reconstructed. The reconstructed data in ATSIS, however, is not vectorial and not georegistered. See Justin M. Wanek, Chin H. Wu, "Automated trinocular stereo imaging system for three-dimensional surface wave measurements", 2005.

Structure from Motion (SfM) provides a system capable of reconstructing 3D coordinates of a scene which may include the geo-registration of the data. SfM allows the 3D reconstruction of a scene, including the georegistration of points as long as the GPS locations of the camera are known at the moment the picture was taken. Structure from Motion generally involves the use of GPS systems embedded on the camera platform. The geodetic coordinates obtained from such GPS units are unreliable, therefore correcting such readings is an ongoing research area. To offset the errors from the GPS readings (and other sources of errors such a drift from bundle adjustment) a fusion of GPS and bundle adjustment must be performed. SfM however is not designed for factorial data, requires ground control points (GCPs), and is not a point-and-shoot system (i.e., user input required). See Carrivick, Jonathan L., Mark W. Smith, and Duncan J. Quincey. Structure from Motion in the Geosciences. John Wiley & Sons, 2016.

Lidar systems can provide for point cloud generation, but can only be done for static scenes or, in some cases, can be used on slowly changing scenes, provided that the scene does not change before the Lidar system acquires the data (typically on the order of minutes). Lidar systems therefore can provide georegistration of points, but only in a post-processing step, which generally require long processing times and acquisition times.

Thus, there exists a need for a solution to provide a system to work in a broad range of environmental conditions especially in waterscape environments as well as resolve spatial regions that have high temporal changes with a point-and-shoot system.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present disclosure relates to systems and methods for 3D reconstruction and georegistration of points for analyzing water flow.

The present disclosure provides for a method for characterizing a water flow. The method may include receiving, by a computing device, a first set of one or more images captured by a first camera and a second set of one or more images captured by a second camera, wherein a first position of the first camera is fixed relative to a first position of the second camera, and progressively tracking one or more features across a decreasing scale of tiled sets of one or more of the images. The method may include generating point data for each of the one or more tracked features based on a coordinate system relative to the first camera or the second camera, and transforming the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device is configured to provide a geolocation of the origin of the first GPS device. The method may include generating, based on the transformed point data, a geodetic mapping function, determining, based on the geodetic mapping function, georegistered coordinates of the one or more tracked features, using the georegistered coordinates of the one or more tracked features to characterize the water flow, and performing aquatic operations in the water flow based on the characterization of the water flow.

The present disclosure provides for a system for characterizing a water flow. The system may include a first camera and a second camera, wherein a first position of the first camera is fixed relative to a first position of the second camera. The system may include a feature tracker configured to progressively track one or more features across a decreasing scale of tiled sets of one or more of the images. The system may include a displacement generator configured to generate point data for each of the one or more tracked features based on a coordinate system relative to the first camera or the second camera. The system may include a geodetic generator configured to transform the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device configured to provide a geolocation of the origin of the first GPS device, generate, based on the transformed point data, a geodetic mapping function, and determine, based on the geodetic mapping function, georegistered coordinates of the one or more tracked features.

The present disclosure provides for a non-transitory computer readable medium comprising computer code for characterizing a water flow, the computer code, when executed by a processor, performing one or more steps. The steps may include receiving a first set of one or more images captured by a first camera and a second set of one or more images captured by a second camera, wherein a first position of the first camera is fixed relative to a first position of the second camera, and progressively tracking one or more features across a decreasing scale of tiled sets of one or more of the images. The steps may include generating point data for each of the one or more tracked features based on a coordinate system relative to the first camera or the second camera, transforming the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device is configured to provide a geolocation of the origin of the first GPS device, and generating, based on the transformed point data, a geodetic mapping function. The steps may include determining, based on the geodetic mapping function, georegistered coordinates of the one or more tracked features, and using the georegistered coordinates of the one or more tracked features to characterize the water flow, wherein aquatic operations are performed in the water flow based on the characterization of the water flow.

DETAILED DESCRIPTION

Figure 1A:
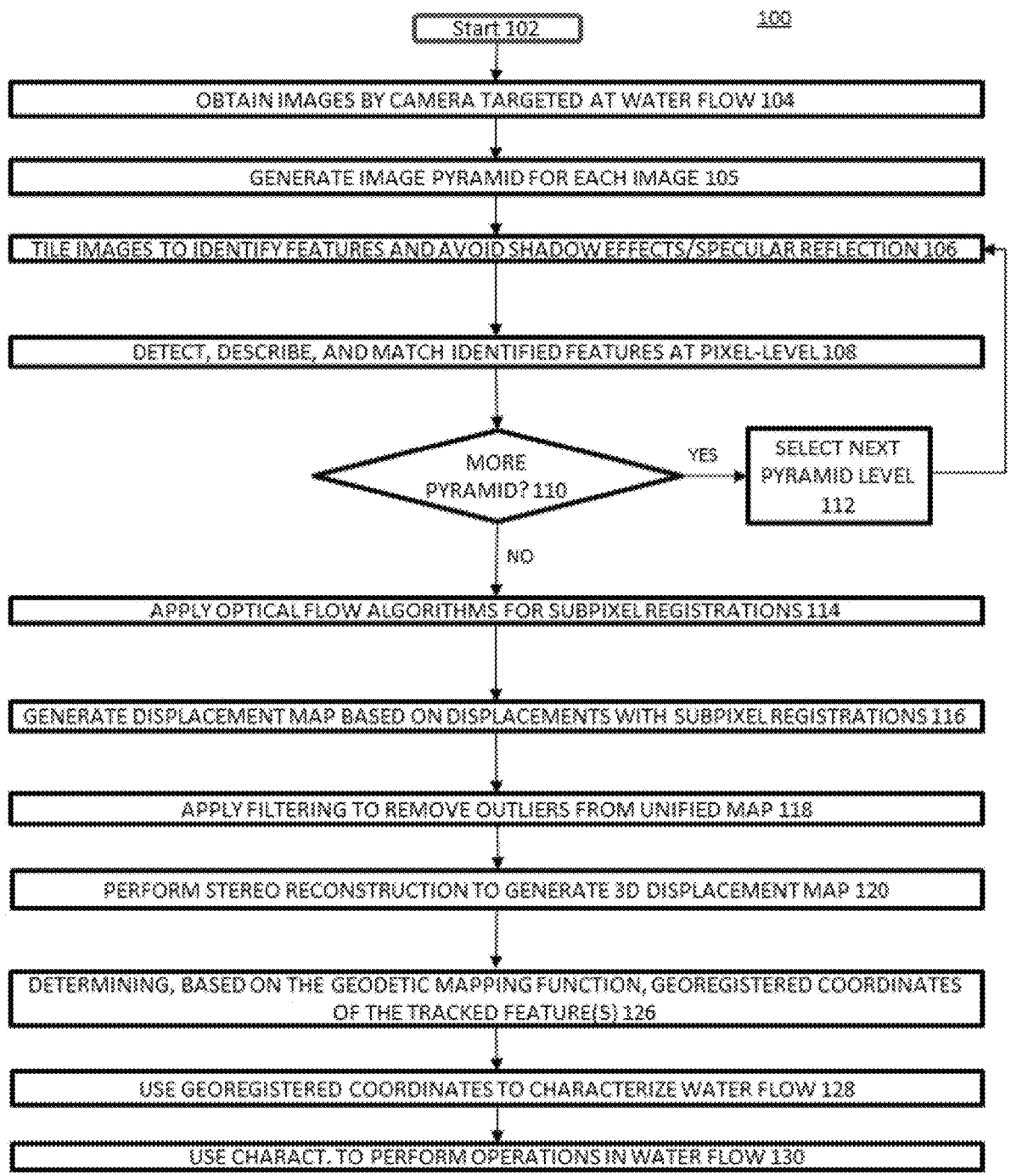
FIGS. 1A, 1B, 1C, and 1D show example workflows for characterizing water flow, in accordance with disclosed aspects.

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

Successful PIV analysis depends on the presence of a random speckle pattern throughout captured field (i.e., local differences in the intensity). In LSPIV studies, adding a seeding material to the flow is usually not a viable or sustainable option. However, the lack of seeding in the flow needed for correlating the images can be overcome by using the color texture obtained from the waves on the surface of the water.

The use of FFT for image correlation is well studied and several implementations are available. Nevertheless, the user input required to set the parameters to properly interrogate the images is demanding, time consuming, and results in a steep learning curve for LSPIV systems. In particular, the proper selection of image subregion sizes is critical since it is a function of the size of the regions to be tracked (e.g., waves) and the amount of displacement that is taking place. To avoid large non-correlatable regions, image masking is often needed. For example, masking is commonly used to remove large portions of water surface that are perceived as large white blobs due to specular reflections from the sun. An objective of the embodiments described herein is to significantly reduce the user input required to obtain the displacement vector fields from the images by replacing the FFT approach with feature tracking to autonomously find similarities in images.

Feature Matching between images is a topic that has been highly researched in the Computer Vision community. The methodology for Feature Tracking can be divided into two steps. The first step is automatically detecting the trackable regions, which are regions high in color (grayscale) texture. Finding the trackable regions (i.e., features) can be achieved by using one (e.g., Scale-Invariant Feature Transform (SIFT) features) or a combination of many different algorithms (e.g., Harris corner detectors or Features from Accelerated Segment Test (FAST)). Once the features are detected, a descriptor should be assigned to each feature. Several possibilities exist for a descriptor, such as the traditional descriptor for FFT correlation (grayscale map) or more robust descriptors like the SIFT descriptor or the binary robust independent elementary features (BRIEF) descriptor. Finding matching features between images is accomplished by a comparative, descriptor metric. This final step can be achieved by finding the inner product of the descriptors for grayscale maps and SIFT descriptors or by taking the Hamming distance in the case of binary descriptors such as BRIEF.

Embodiments herein relate to obtaining a displacement or velocity field of a stream surface that requires no user input. Images captured by a camera can be cross-correlated (e.g., features from accelerated segment test (FAST) algorithm) to automatically extract image subregions rich in color texture and detect the trackable regions (i.e., features). Feature matching can be achieved by comparing features (e.g., BRIEF descriptors composed binary strings) along with enhance subpixel displacement detection based on, for example, the Lucas-Kanade optical flow equation. To increase efficiency, a nearest neighbor search is performed to restrict the features compared to only those that are close to each other.

FIG. 1A shows an example workflow 100 for autonomous characterization of water flow from surface water velocity. As is the case with the other aspects and processes described herein, various embodiments may not include all of the steps described below, may include additional steps, and may sequence the steps differently. Accordingly, the specific arrangement of steps shown in FIG. 1A should not be construed as limiting the scope of autonomous characterization of water.

Aspects described herein, such as with respect workflow 100 can be carried out and performed by and/or with the devices, components, and/or systems described herein. For example, FIGS. 5A-5C show various views of an example camera system 500 embodiment in accordance with disclosed aspects. FIG. 5A shows a side perspective view, FIG. 5B shows a top view, and FIG. 5C shows a front view. Measurements shown in the figures are in millimeters, and are used as examples. Other measurement, values may be used in accordance with disclosed aspects.

The camera system 500 may include a first camera 502 and a second camera 504. In some embodiments, one camera may be used in accordance with disclosed aspects (e.g., camera 502). In some embodiments, more than two camera may be used in accordance with disclosed aspects. First camera 502 may be enclosed in a first open housing 506, and second camera 506 may be enclosed in a second open housing 508.

Figure 5:
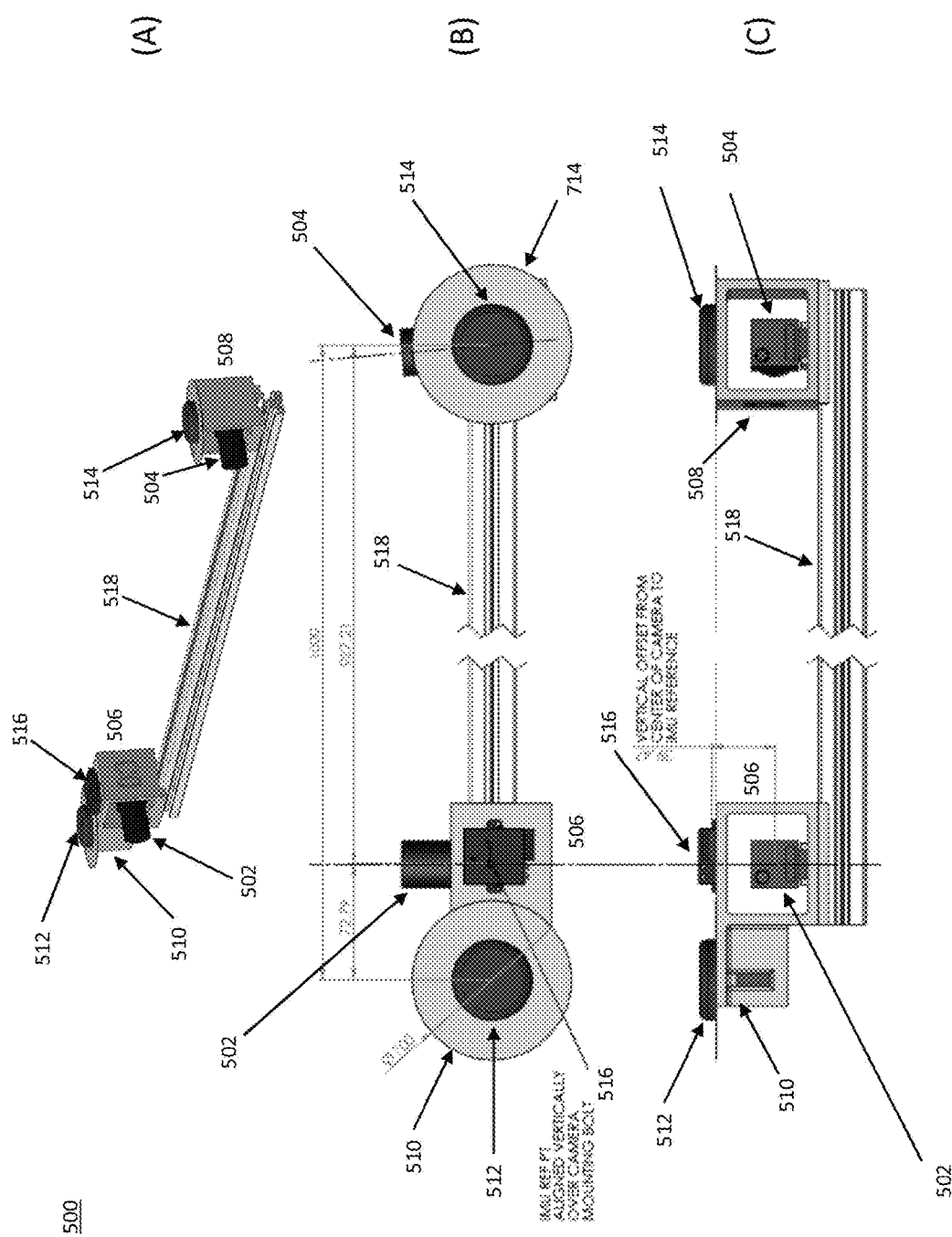
FIGS. 5A-5C show various views of an example camera system in accordance with disclosed aspects, in accordance with disclosed aspects.

The first open housing 506 may have an extended lateral portion 510 that supports and/or couples to a first Global Positioning System (GPS) device 512. The GPS device 512 may be fixedly attached relative to the first camera 502. In one example, the first GPS device 512 may be disposed on a top side of the extended lateral portion 510. In one example, the first GPS device 512 may be vertically aligned and/or offset with the first camera 502. The first GPS device 512 may be vertically and/or horizontally offset with the first camera 502, as shown in FIG. 5. The vertical offset distance and/or the horizontal offset distance may be fixed and known. In some embodiments, the GPS device 512 may be or include one or more antennas.

The first open housing 506 may support and/or couple to an Inertial Navigation System (INS)/inertial measurement unit (IMU) device 516. In one example, the IMU device 516 (or INS device) may be disposed on a top side of the first open housing 506. In some embodiments, the IMU device 516 may be vertically aligned and/or offset with the first camera 502. For example, a reference point on the IMU device 516 may be aligned along a common vertical axis with the center of the first camera 502. The vertical offset distance may be fixed and known.

In some cases, the second open housing 508 may support and/or couple to a second GPS device 514. For example, the second GPS device 514 may be an antenna (e.g., a second antenna providing more accuracy and/or precision) for the first GPS device 512. In another example, the second GPS device 514 may be a separate GPS device from the first GPS device 512, and may in some cases, be used in addition to the first GPS device 512. For example, the second GPS device 514 may be disposed on a top side of the second open housing 508. In one example, the second GPS device 514 may be vertically aligned and/or offset with the second camera 504. For example, the center of the GPS device 514 may be aligned along a common vertical axis with the center of the second camera 504. The vertical offset distance may be fixed and known. Housings 506 and 508 may be composed of plastic, metal, and the like.

The second GPS device 514 may be fixedly attached relative to the second camera 504. In some embodiments, the vertical offsets of the first GPS device 512, the second GPS device 514, and the IMU device 516 from a respective camera 502, 504 may be substantially the same.

The first camera 502 and the second camera 506 may be coupled and/or connected together by a rig extension 518 to form a camera rig system. In some embodiments, the camera rig system (and/or components thereof) may be supported by a support portion. For example, the support portion may be a base, such as a camera tripod or the like.

Figure 6A:
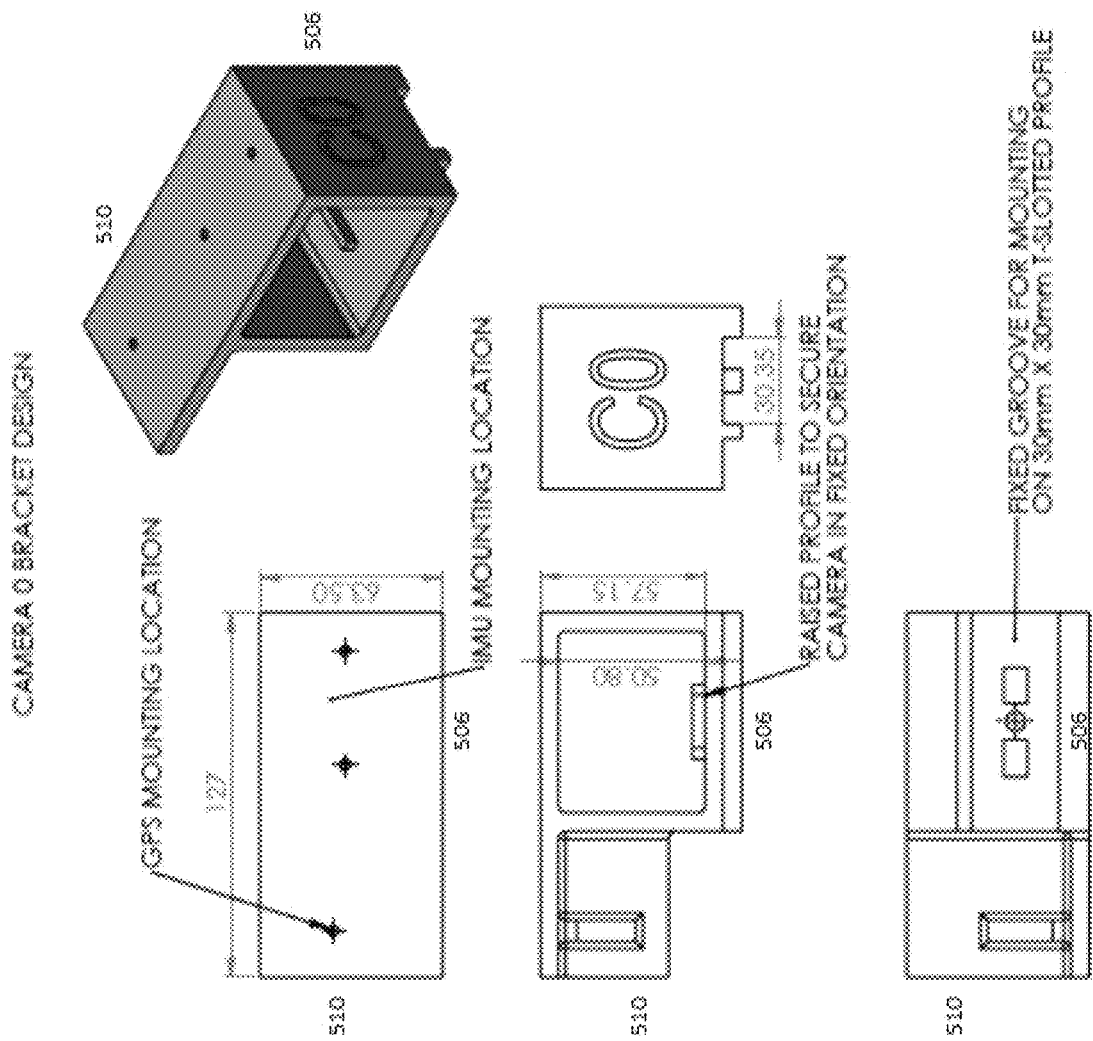
FIGS. 6A and 6B show examples of a first camera housing and a second camera housing, in accordance with disclosed aspects.
Figure 6B:
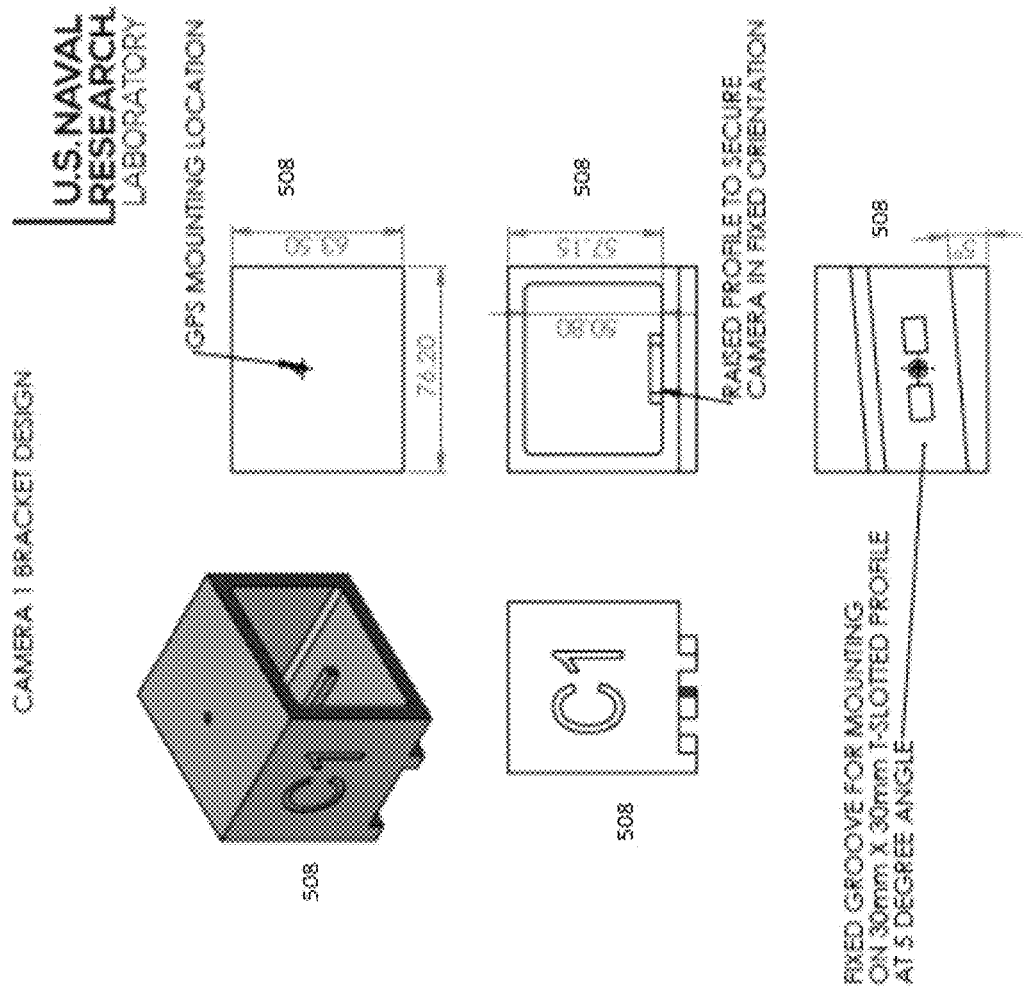

First housing 506 and second housing 508 are shown in more detail in FIGS. 6A and 6B. FIGS. 6A and 6B show examples of first housing 506 and second housing 508, in accordance with aspects described herein. A shown in FIG. 6A, the GPS mounting location of the first GPS device 512 can be disposed on a top side of the extended lateral portion 510 of housing 506. The IMU mounting location of the IMU device 516 can be disposed on a top side of the housing 506, such as vertically located over the first camera 502.

The first camera 502 can be disposed in the first housing 506 on a raised profile surface, which can be used to secure the first camera 502 in a fixed orientation. For example, a fixed groove (or the like) can be used to mount the first camera 502. As shown in FIG. 6A, the GPS mounting location of the second GPS device 514 (e.g., GPS device or antenna) can be disposed on a top side of the second housing 508. The second camera 504 can be mounted and/or disposed in the second housing 508 in the same or substantially the same manner as the first camera 502 in the first housing 506. The mounting locations are examples only, and the mounting locations of any of the components can be in other locations.

Figure 7:
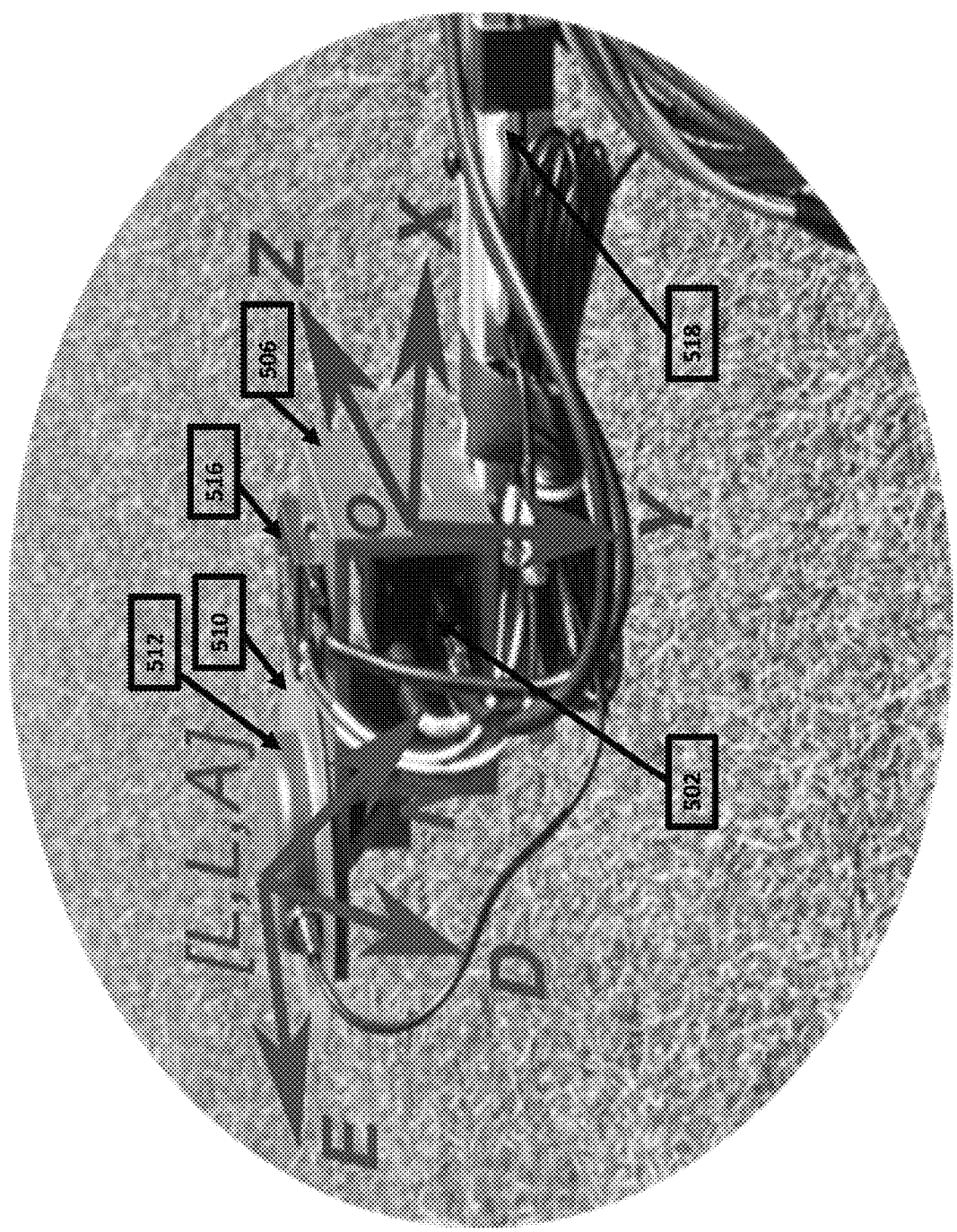
FIG. 7 shows an embodiment of a first camera side of the camera system, in accordance with disclosed aspects.

FIG. 7 shows an embodiment of the first camera 502 side of the camera system 500. As shown, the first GPS device 512 can provide latitude, longitude, altitude (L, L, A) coordinates with a reference point/origin at the first GPS device 512, in a directional coordinate system, such as North (N), East (E), and Down (D). The IMU device 516 can provide an orientation associated with the system 500, such as measured at an origin of the IMU device 516. The orientation may be in (Yaw, Pitch, Roll) coordinates. The camera coordinates (X, Y, Z) can be shown with a reference/origin (O) at or near the camera location. According to some aspects, the vertical and/or horizontal offsets from a camera to the GPS or IMU devices can be known and used when performing steps and aspects described herein.

Referring back to FIG. 1A, workflow 100 starts at block 102 and then proceeds to block 104, where images are obtained at regular intervals so that a time-series analysis can be performed. In block 105, an image pyramid is generated for each image. The image pyramid can include various levels of images of progressively reduced length-scale. For example, the first level image can be at the original scale, the second level image can be at half the original scale, the third level image can be at quarter the original scale, and so on. Various scale reductions and numbers of levels can be used for the image pyramid.

In block 106, each of the images is tiled, such as across a decreasing scale. By tiling and normalizing the grey-scale of each image with a heuristically defined length-scale, features can be extracted while significantly suppressing the effect of shadows and steep grey-scale/color gradients, which normally would lead to the detection of a very low number of features. Typical computer vision techniques that extract features from the whole image are particularly ineffective in water flows because water flow features (e.g., ripples) are generally more redundant and less prominent than typical features. The size of the tile can be preconfigured or determined automatically based on the size of the original image. Further, the tile size remains consistent across the different levels of the image pyramid, and the number of levels in the pyramid can be dependent on the tile size (e.g., the last level of the pyramid should have at least four tiles).

In block 108, features are progressively detected, described, matched, and tracked at the pixel-level across the time-series of images. For example, the FAST and BRIEF algorithms can be used to track the features. The tracked features result in displacements (i.e., displacement vectors, which may be locations of points at different times) that show the magnitude and direction of the features during each time step. In block 110, workflow 100 can determine if there are additional pyramid images to process. In other words, steps 106-108 can be progressively repeated using a scale-space approach to extract additional salient features at various scales. If it is determined that there are more pyramid images to be processed, the next level of the pyramid is selected. At this stage, workflow 100 can return to block 106 to process the scaled down images.

After all the pyramid images are processed, optical flow algorithms can be applied to the displacements to determine subpixel registrations in block 114. For example, Lucas-Kanade optical flow equations can be applied to obtain subpixel level displacement fields for every scale of the image pyramid. In block 116, workflow 100 may include generating displacement vectors for each of the tracked features based on the coordinate system relative to the camera(s). For example, 3D displacement maps are generated from the displacements with the subpixel registrations for each pyramid level.

In block 118, a filtering algorithm is applied to remove outliers from a unified 3D displacement vector map. The unified displacement vector map can be generated by combining the displacement maps from the different levels of the image pyramid. An example filtering algorithm is described below with respect to FIG. 1B.

In block 120, stereo reconstruction is performed to combine the unified displacement vector maps from different cameras into a final 3D vector displacement map. Alternatively, for single camera systems, the 3D reconstruction can be performed by using geo-referenced control points and a Nomography to convert from pixels to physical units.

In block 126, workflow 100 may include determining, based on a geodetic mapping function, georegistered coordinates of one or more tracked features. Block 126 may include transforming point data and/or the displacement vector map (i.e., displacement vectors indicating velocity) to a GPS/INS coordinate system. The transformation may be based on an origin of a GPS device (e.g., a GPS puck device) coupled to a camera (e.g., the first camera). The transformation may alternatively and/or additionally be based on a rotation or angle of the camera(s) relative to the INS or GPS devices. The GPS device can provide a geolocation of the origin of the GPS device.

The transformation of the displacement vectors to the GPS/INS coordinate system can include transforming the displacement vectors based on yaw, pitch, and roll coordinates associated with the camera rig system. For example, the displacement vectors can be transformed to the GPS/INS coordinate system based on the rotation of the first camera and second camera relative to the GPS device comprises transforming the displacement vectors based on yaw, pitch, and roll coordinates associated with the camera rig system.

In some embodiments, the displacement vectors are transformed to the GPS/INS coordinate system by determining an offset between (i) the GPS/INS coordinate system relative to the first camera or the second camera and (ii) physical location of the GPS device or the INS device. According to some aspects, the displacement vectors can be transformed using latitude, longitude, and altitude (LLA) coordinates associated with the GPS device.

Block 126 may include generating, based on the transformed displacement vectors, a geodetic mapping function. For example, the geodetic mapping function (e.g., a mapping function used to transform data to Earth coordinates) can be used to determine latitude, longitude, and altitude (LLA) georegistered coordinates of the tracked features.

Figure 1B:
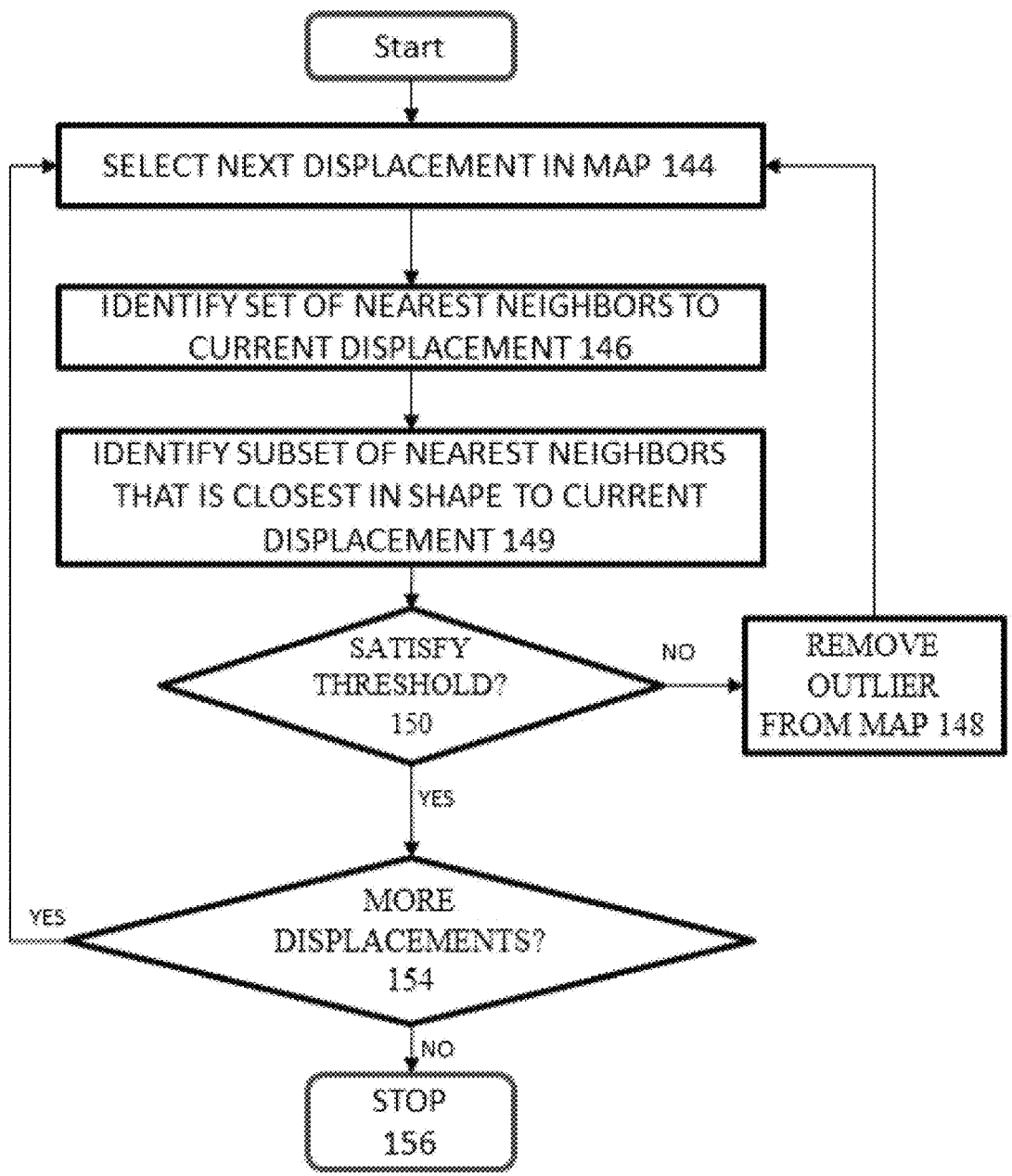
Figure 1C:
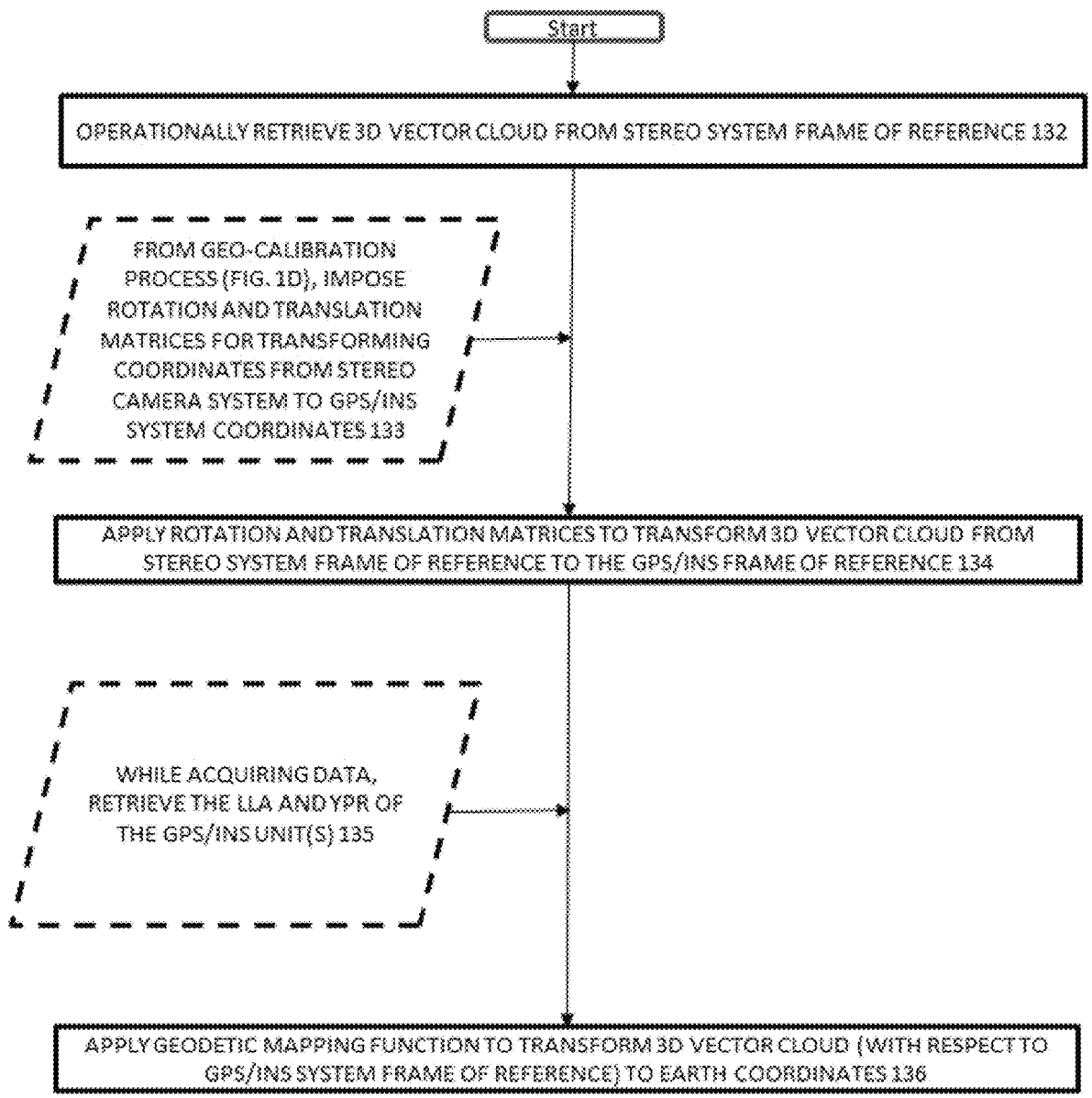

FIG. 1C illustrates an example workflow 131 of the georegistration process of block 126 of workflow 100 in accordance with disclosed aspects. Referring to FIG. 1C, in block 132, workflow 131 may include operationally retrieving the point data and/or 3D vector cloud data at the stereo system frame of reference, such as described here. For example, the frame of reference of the camera stereo system may be from one of the camera, such as, for example, from a frame of reference of a first camera of one or more cameras or from a left camera's frame of reference.

Figure 1D:
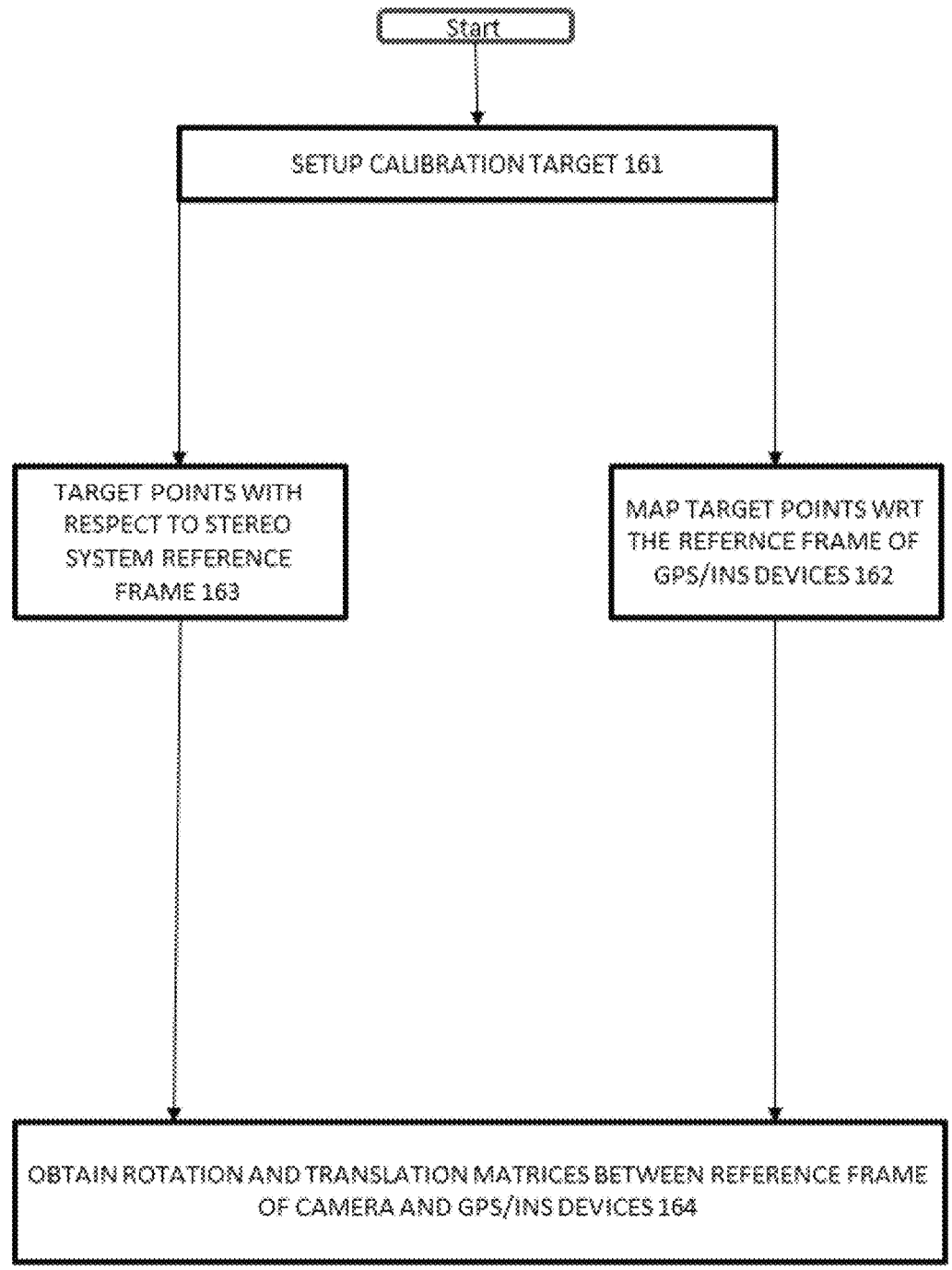

In block 133, workflow 131 may include retrieving rotation and/or translation information (e.g., matrices) for transforming coordinates from the frame of reference of stereo camera system to coordinates of a GPS/INS system frame of reference. The rotation and/or translation information may be generated in a geo-calibration process in accordance with disclosed aspects. FIG. 1D illustrates a workflow 160 of generating rotation and/or translation information from calibration data.

Referring to FIG. 1D, workflow 160 may be performed at any time, such as before steps in FIGS. 1A-1C, such as a being a calibration for the camera system. According to some aspects, the geo-calibration of workflow 160 may be performed once for the camera system to provide a point and shoot calibrated camera system, where the calibration is based on the fixed locations of the components of the camera system/rig. For example, the cameras, IMU/INS device(s), GPS device(s), and the like may be fixed relative to one another.

In block 161, workflow 160 may include setting up a calibration target, such as an object with a pattern that may be used to calibrate the camera system. For example, a checkerboard pattern may be used as a calibration target, and the checkerboard pattern may provide calibration points used in the calibration process.

In block 162, the target points may be mapped to the frame of reference of the GPS/INS/IMU devices. In this step, the calibration target points may be determined in Earth Coordinates (i.e., coordinates of the checkerboard pattern points on Earth), such as via the GPS, INS, and/or IMU devices. For example, the coordinates of the calibration target points may be determined in latitude, longitude, and altitude (LLA) and in yaw, pitch, and roll coordinates. Based on this, the calibration target points may be mapped to the frame of reference of the GPS/INS/IMU devices via use of the GPS, INS, and/or IMU devices coupled to the camera(s).

In block 163, the 3D reconstruction of the target points are generated with respect to the reference frame of the stereo camera system, such as described herein. At block 164, the rotation and/or translation information is generated between the reference frame of the camera (e.g., using information from block 163) and the frame of reference of the GPS/INS/IMU devices. For example, the rotation and/or translation information may be generated in the form of rotation and/or translation matrices, which can be used and applied to features, points, position and velocity vectors, and the like to map from one frame of reference to another. The rotation and/or translation information may be used in workflow 131, such as in block 152 of workflow 131 of FIG. 1C.

According to some aspects, calibration process may capture and determine the relative positions between the components of camera system (e.g., between the one or more cameras, GPS, IMU, and/or INS devices). These relative positions may be used in the geodetic mapping operations and in the transformation operations, as described herein.

Referring back to FIG. 1C, in block 134, the rotation and/or translation information (e.g., matrices) may be applied to transform the point data (e.g., 3D vector cloud) from the stereo system frame of reference to the GPS/INS coordinate system. In block 135, the camera system may acquire data (e.g., tracked features in images), and may retrieve the LLA and YPR coordinates of the GPS/INS/IMU devices. In block 136, the geodetic mapping function may be applied to the acquired data/tracked features to transform the point data (e.g., 3D vector cloud) from the GPS/INS coordinates to georegistered coordinates (earth coordinates). That is, at block 136, the generated rotational and translation matrices (R, T) may be used to transform points, data, and/or features between the camera's frame of reference and the frame of reference of the GPS/INS/IMU devices.

In block 128, the georegistered coordinates of the tracked features can be used to characterize the water flow. For example, the georegistered coordinates of the tracked features can be used to identify currents in coastal waters. In another example, the georegistered coordinates of the tracked features can be used to determine discharge of a river flow.

In block 130, the water flow characterizations can be perform operations (e.g., vessel navigation, unmanned underwater vehicle (UUV) remote operation, deployment of sensor devices, etc.) in the water flow. In some embodiments, LLA georegistered coordinates of the tracked features can be used to characterize the water flow.

Embodiments herein provide a point-and-shoot system that allows the 3d reconstruction and georegistration of points/point cloud data. The system is compact when compared to traditional Structure from Motion setups. Despite the fact that it is a stereo system, even with two cameras, the georegistration of points/point cloud data is accurate due to the accuracy of the GPS/INS hardware and the calibration process to determine the offset between the camera coordinate system and the physical location of the GPS/INS unit.

Embodiments herein provide the ability to generate encoded geo-data without user interaction, such as required in prior art systems. Embodiments provide for a point-and-shoot system that can be readily applied in multiple locations. Embodiments can work in a broad range of environmental conditions especially in waterscape environments as well as resolve spatial regions that have high temporal changes. Aspects described herein provide an inexpensive system when compared to prior art systems, which generally are one or two orders of magnitude more expensive.

Embodiments herein provide for combining a stereoscopic camera system with a GPS/INS module to retrieve the geodetic coordinates of the three dimensional components of a velocity vector field obtained with a camera-based field velocimetry. Embodied methods and systems initially provide for a calibration process, for example: 1) Calibration of the stereo camera pair (e.g., with chessboard pattern); and 2) Calibration to transform reconstructed stereo points from camera coordinate system to a GPS/INS coordinate system. Once the two calibration processes are completed, Embodied methods and systems provide for geo-encoding that includes: 1) Stereo reconstruction of scene from image pair; 2) Change of coordinates of reconstructed points from camera coordinate system to GPS/INS coordinate system; and 3) Change of coordinate system from GPS/INS to lat-lon-alt using the GPS/INS position and attitude data.

Embodiments herein allow for a one-time calibration that includes finding a function that maps points from the following: camera coordinates→GNSS+IMU hardware coordinates→geodetic coordinates, where GNSS is a global navigation satellite system (i.e., GPS) and IMU is inertial measurement unit.

Embodiments herein provide for a data feed of system position (Latitude Longitude, Altitude) and orientation (Yaw, Pitch, Roll) can be used to automatically georegister image data and/or features. Embodiments herein provide a system that dynamically updates georegistered data for any camera pose using a stereo reconstruction that is fused with GPS and IMU data. Embodiments herein can be scaled to a plurality of cameras.

According to some aspects, the georegistered coordinates (e.g., LLA) of the tracked features may be dynamically updated the determined if the first camera or the second camera moves to a different location or locations. For example, the camera system may be calibrated in one spot, and then deployed on a vehicle or aircraft, which may then use the camera system to capture features, data, and/or images, which may then be georegistered in accordance with disclosed aspects. In this way, aspects and embodiments disclosed herein may be used in other manners in addition to characterizing water flow, such as tracking and georegistering any imaged features that may move over time. According to some aspects, the georegistered coordinates can be determined independent of in situ surveyed ground control points.

FIG. 1B shows an example workflow 198 for removing outliers from a 3D displacement map. The specific arrangement of steps shown in FIG. 1B should not be construed as limiting the scope of removing outliers. Aspects described herein, such as with respect workflow 198 can be carried out and performed by and/or with the devices and systems described herein.

Workflow 198 can be applied to a unified displacement map generated from the pyramid images. Workflow 198 starts in block 142 and then proceeds to block 144, where the next displacement in a displacement map is selected. In block 146, an initial set of nearest neighbors of the current displacement is identified. The number of nearest neighbors in the initial set can be configured to optimize performance and/or accuracy. In one example, the initial set is determined by selecting the specified number of nearest neighbors.

In block 149, a subset of the nearest neighbors that are closest in shape to the current displacement is identified. In an example where the initial set has six nearest neighbors, two neighboring displacements that are the most similar to the current displacement can be included in the subset. The shape of displacements can be compared by comparing their magnitude and direction. For example, the inner product of the current displacement with each one of displacements in the initial subset can be calculated and then normalized with the magnitude of the current displacement. In this example, the normalized inner products that are closest to one would be the most similar.

In block 150, a determination is made as to whether the displacements in the subset satisfy a threshold requirement. Continuing the above example, a displacement in the subset satisfies the threshold if absolute value of 1—the normalized inner product is less than a specified threshold (e.g., 0.4). If the displacements in subset do not satisfy the threshold, the current displacement is removed from the 3D displacement map in block 148 and then workflow 198 returns to block 144 to process the next displacement.

If the displacements in the subset do satisfy the threshold, the current displacement is maintained in the 3D displacement map and workflow 198 proceeds to block 154, where a determination is made as to whether there are more displacements in the displacement map to process. If there are more displacements to process, workflow 198 returns to block 144 to process the next displacement.

In some cases, the median distance between all features in the image can be used to handle features with a sparse number of neighbors. In this case, the median distance is used to identify nearest neighbors for the initial set, where the displacement can be removed as an outlier if the initial set does not include a sufficient number of candidates.

Figure 2:
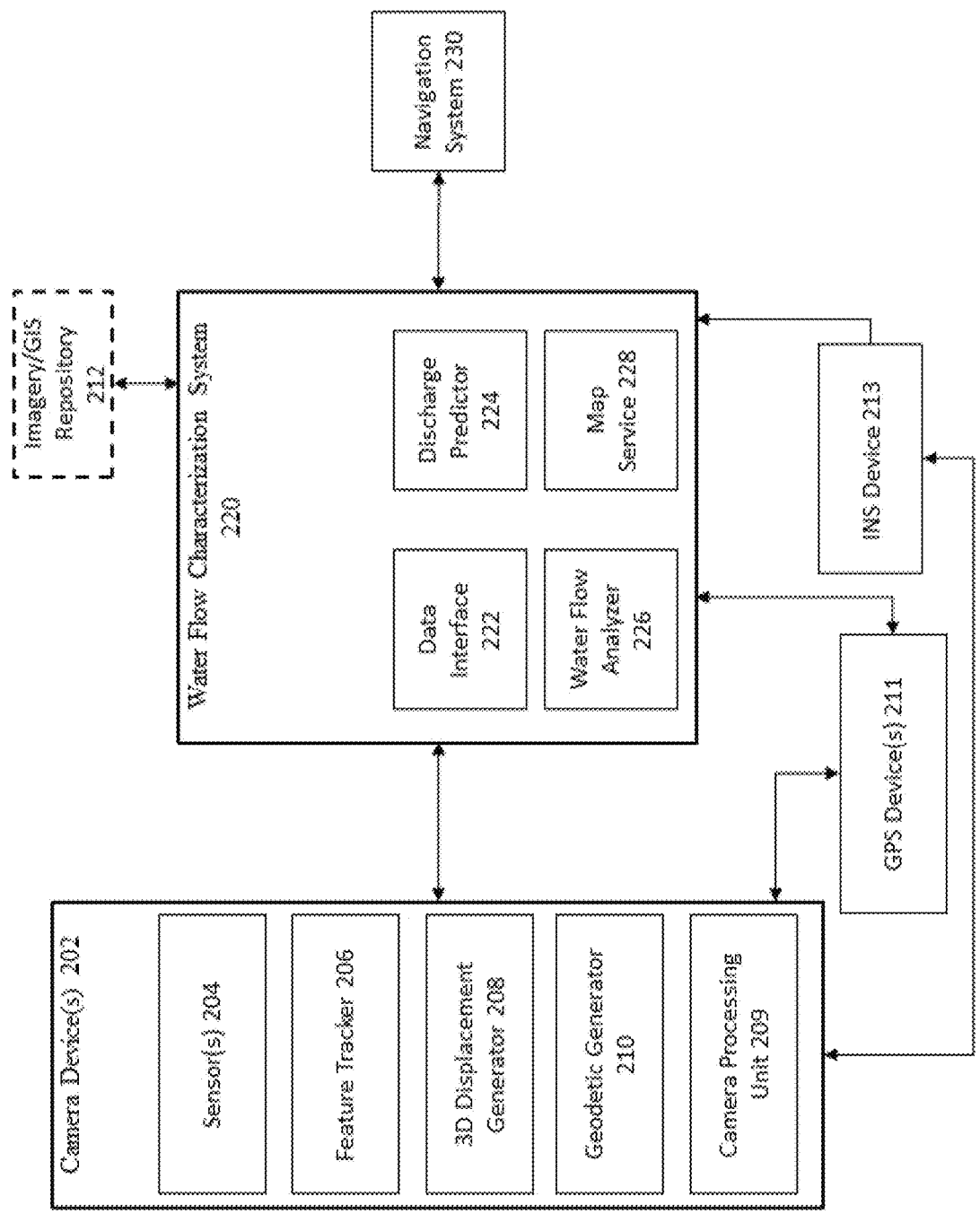
FIG. 2 shows an example system for characterizing water flow, in accordance with disclosed aspects.

FIG. 2 shows an example system 200 for autonomous characterization of water flow from surface water velocity. The system 200 includes camera device(s) 202, GPS device(s) 211, INS device(s) 213, a water flow characterization system 220, and a navigation system 230. In some embodiments, the system 200 can also an imagery/geographic information system (GIS) repository 212. In some embodiments, camera device(s) 202 may be similar to or the same as cameras 502 or 504 (FIG. 5). In some embodiments, GPS device(s) 211 may be similar to or the same as GPS devices 512 or 514 (FIG. 5). In some embodiments, INS device(s) 213 may be similar to or the same as INS device 516 (FIG. 5).

Camera device(s) 202 are configured to capture images of a water flow. Camera device(s) include sensor(s) 204, a feature tracker 206, a 3D displacement generator 208, and a geodetic generator 210. In some cases, camera device(s) 202 can be mounted to a stationary object (e.g., bridge, sensor station, etc.) aimed at a water flow. In other cases, camera device(s) 202 can be mounted to a vehicle (e.g., unmanned aerial vehicle (UAV), water vessel, etc.). The camera device(s) 202 are configured differently depending on their number.

For two or more camera device(s) 202, the camera device(s) 202 are calibrated to synchronize their views, where the views are synchronized based on the zoom, relative distance, relative angle, etc. of each of the camera device(s) 202. For a single camera device 202, the 3D displacement generator 208 is configured to perform 3D stereo construction by using geo-referenced points and a homography.

Sensor(s) 204 can include various image sensors for capturing high-resolution images. The sensor(s) 204 can be configured to capture the images at various time intervals. Feature tracker 206 is configured to identify and track features as described above with respect to FIGS. 1A-1B. Specifically, feature tracker 206 can be configured to use, for example, the FAST and BRIEF algorithms to generate feature related data. Feature tracker 206 can automatically identify features by using image pyramid processing.

Feature tracker 206 uses a similar approach to the ORB (Oriented FAST and rotated BRIEF) algorithm, which uses the FAST algorithm to rapidly detect the feature candidates and the BRIEF algorithm to describe and efficiently match the features by using the Hamming distance. Feature tracker 206 achieves scale invariance in ORB by using an image pyramid scheme, and the robustness of the feature extraction is relaxed by removing the Harris filtering step of ORB. Feature tracker 206 also uses two additional steps to increase accuracy and efficiency. First, a nearest neighbor search is used when comparing other features that are close to the feature being matched. Traditional feature matching takes a feature in one image and compares it to all features in the other image to find the best match. The traditional image-wide feature matching is costly since the time for searching for matches approximately scales as the square of the number of features. For the flow velocimetry application, image-wide feature comparison is unnecessary since only the nearest neighbors are candidates for a match. Second, the displacements maps are updated to include subpixel registration. The original ORB algorithm can only match or track features at a pixel level, which limits accurate velocity field estimates. Traditional subpixel techniques used in feature tracking take the pixel location of an image feature and optimize the location at subpixel level using the information of that single feature. For example, to detect and enhance subpixel displacements for velocimetry applications, the Lucas-Kanade optical flow equation can be applied to the pixel level feature displacements, where the flow equation uses the information of two features to determine the subpixel displacement.

3D displacement generator 208 is configured to generate displacement maps as described above with respect to FIG. 1A. After the displacement maps are generated, 3D displacement generator 208 can provide the displacement maps to the water flow characterization system 220.

Geodetic generator 210 may be configured to transform the displacement vectors of the generated displacement maps as described above with respect to FIG. 1A. For example, Geodetic generator 210 may be configured to transform the displacement vectors of the generated displacement maps to a GPS/INS coordinate system based on (1) an origin of GPS device(s) 211 coupled to camera device(s) 202 and/or on a rotation of the camera device(s) 202 relative to INS device 213, which may interact and/or be coupled to camera device(s) 202. The GPS device 211 may be similar to or the same as the GPS device(s) 512, 514 in FIG. 5 and may be configured to provide a geolocation of the origin of the GPS device 211, such as providing GPS location information (Lat, Long, Altitude). The INS device 213 may be configured to provide orientation information (Yaw, Pitch, Roll).

The geodetic generator 210 may transform the displacement vectors to the GPS/INS coordinate system comprises determining an offset between (i) the GPS/INS coordinate system relative to camera device(s) 202 and (ii) physical location(s) of the GPS device 211 and/or INS device 213. Geodetic generator 210 may generate a geodetic mapping function based on the transformed displacement vectors and may determine, based on the geodetic mapping function, georegistered coordinates of the tracked features. For example, the geodetic generator 210 may determine latitude, longitude, and altitude (LLA) georegistered coordinates of the tracked features, which may be used to characterize water flow. In some embodiments, the LLA georegistered coordinates of the tracked features may be determined independent of in situ surveyed ground control points.

Together with the GPS/INS device 211, the geodetic generator 210 may dynamically update the determined LLA georegistered coordinates of the tracked features after camera device(s) 202 moves from a first position to a second position. When transforming the displacement vectors to a GPS/INS coordinate system based on the origin of a GPS/INS device 211 (e.g., coupled to the camera device(s) 202 may include transforming the displacement vectors based on the LLA coordinates associated with the GPS device 211, such as when located at the first or second positions.

The aforementioned components 204, 206, 208, 211, 213 of camera device(s) 202 are controlled by a camera processing unit 209. The camera processing unit 209 can be various computing devices (e.g., raspberry pi, laptop computer, etc.). The algorithms described above in FIGS. 1A and 1B can be optimized to execute effectively on the target computing device. For example, the tile size for feature identification can be increased to improve performance. In another example, the size of the candidate set of analyzing outliers can be increased to improve accuracy.

Imagery/GIS repository 212 can be a database, distributed database, data storage device, combination thereof, etc. that is configured to store spatial data and/or imagery. The spatial data can include, but is not limited to, shorelines, GIS data files such as a geodatabase or a shapefile, etc. The imagery can include, but is not limited to, airborne infrared imagery, satellite-borne multispectral imagery, etc.

Water flow characterization system 220 includes data interface 222, discharge predictor 224, water flow analyzer 226, and map service 228. The data interface 222 receives data from the camera device(s) 202 and the imagery/GIS repository 212. In some cases, the data interface 222 can be configured to receive the data directly from the sensor or repository via a wired or wireless protocol. In other cases, the data interface 222 can be configured to receive the data indirectly such as through an intermediate database, physically transported data files that are collected at the location of the sensors, etc.

Discharge predictor 224 predicts discharge values based on displacement maps and depth data of the water flow. The depth data can be obtained from real-time depth sensors and/or the imagery/GIS repository 212. Specifically, the 3D displacement maps from the camera device(s) 202 can used to characterize the flow of water through a 3D model of the bottom of a river section.

Water flow analyzer 226 can identify currents in a water flow based on the 3D displacement maps. For example, the 3D displacement maps can be used to identify rip currents in coastal waters. In this example, consistent one-way displacements in the 3D displacement maps can be recognized as rip currents.

Map service 228 performs GIS functions for the water flow characterization system 220. For example, map service 228 can generate a river map based on the discharge values and 3D displacement maps. In another example, map service 228 can generate a coastline map based on identified currents and 3D displacement maps. Map service 228 can also allow a user to interact with the maps so that it can be modified, rendered on a display, interfaced with a navigation system 230, etc.

Navigation component 230 is used to control the navigation of a watercraft. For example, navigation component 230 may use the water flow characterization to assist a user in avoiding collisions while navigating the watercraft at the river location. In another example, the navigation component 230 can track the current location of the watercraft so that the watercraft location as determined by a global positioning system (GPS) can be rendered in a 3D model of the water flow characterization. In this case, the determined discharge and currents can used in the 3D model to identify/display hazards that are proximate to the watercraft location as it is updated in real-time.

Figure 3:
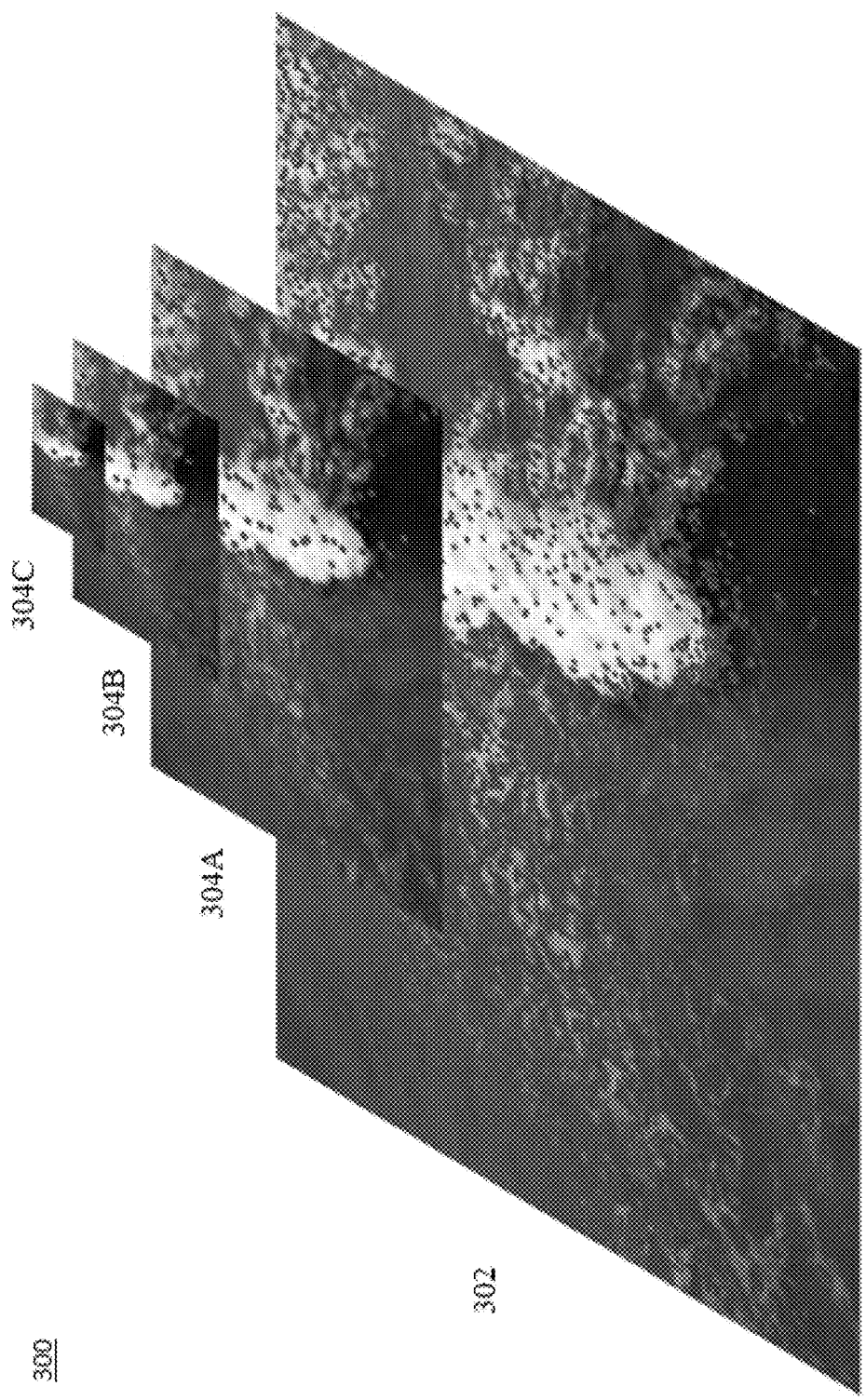
FIG. 3 shows an example image pyramid for feature tracking, in accordance with disclosed aspects.

FIG. 3 shows an example image pyramid 300 for feature tracking. The original image 302 at the original scale shows the displacements determined as described in FIGS. 1A and 1B in red. Similarly, each of the scaled down images 304A-304C shows their corresponding displacements in red. Each of the scaled down images 304A-304C has different displacements than the original image 302 because there is a visual quality loss when the images 304A-304C are the scaled down.

Typical feature tracking algorithms are too discriminant and would result in far less potential features when applied to the shown surface image 302. Because the feature tracking described in FIG. 1A is less discriminant, the robust outlier algorithm described in FIG. 1B is used to remove outliers from the final displacement map.

Figure 4:
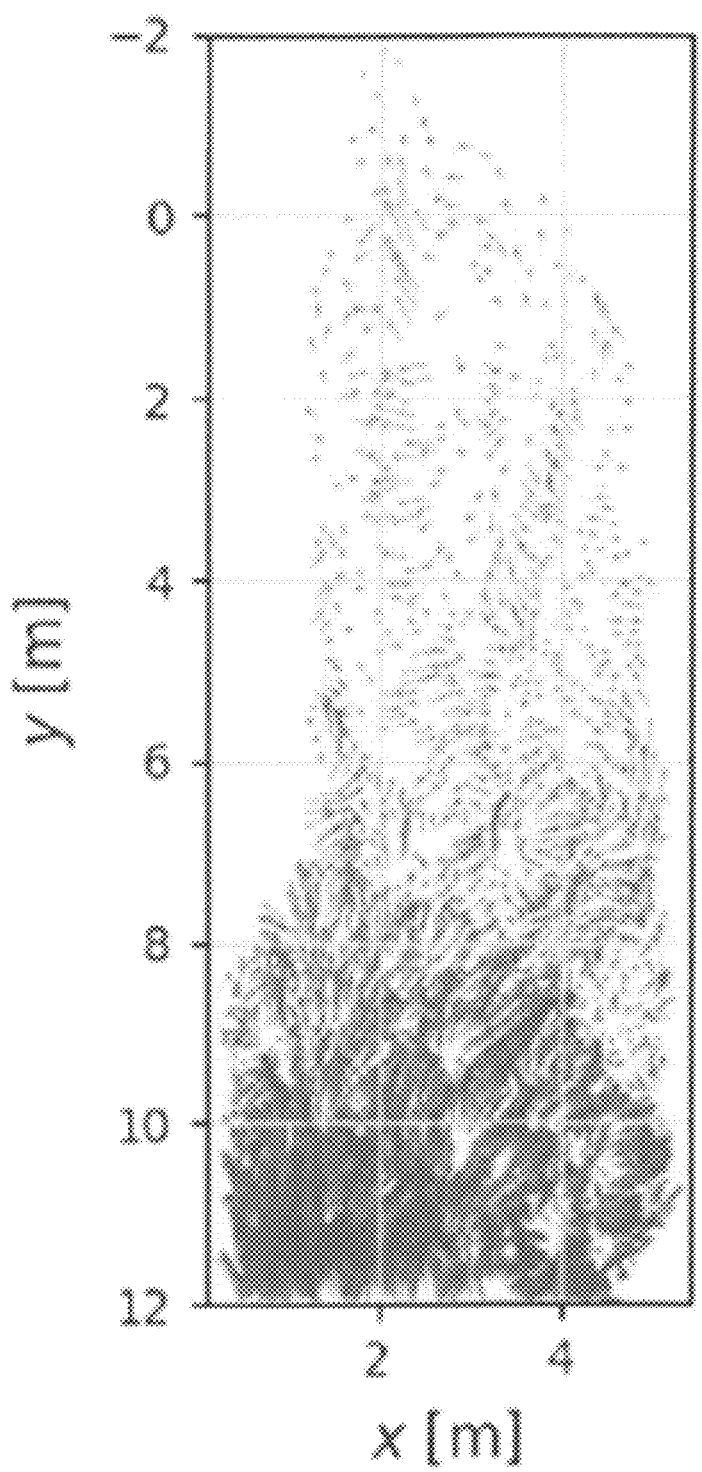
FIG. 4 shows an example dewarped field for use by a single camera system, in accordance with disclosed aspects.

FIG. 4 shows an example dewarped field 400 for use by a single camera system. The dewarped field 400 of a river section allows for 3D displacements to be determined from imagery of a single camera. Once the displacement field is obtained, the field is dewarped to convert displacement values from pixel to physical units (e.g., pixels to meters). A homography matrix can then be constructed by mapping control points that are close to the surface of the water to their corresponding pixel locations in the image. The homography matrix is applied to map all the displacements from pixel locations to corresponding physical locations.

Figure 8:
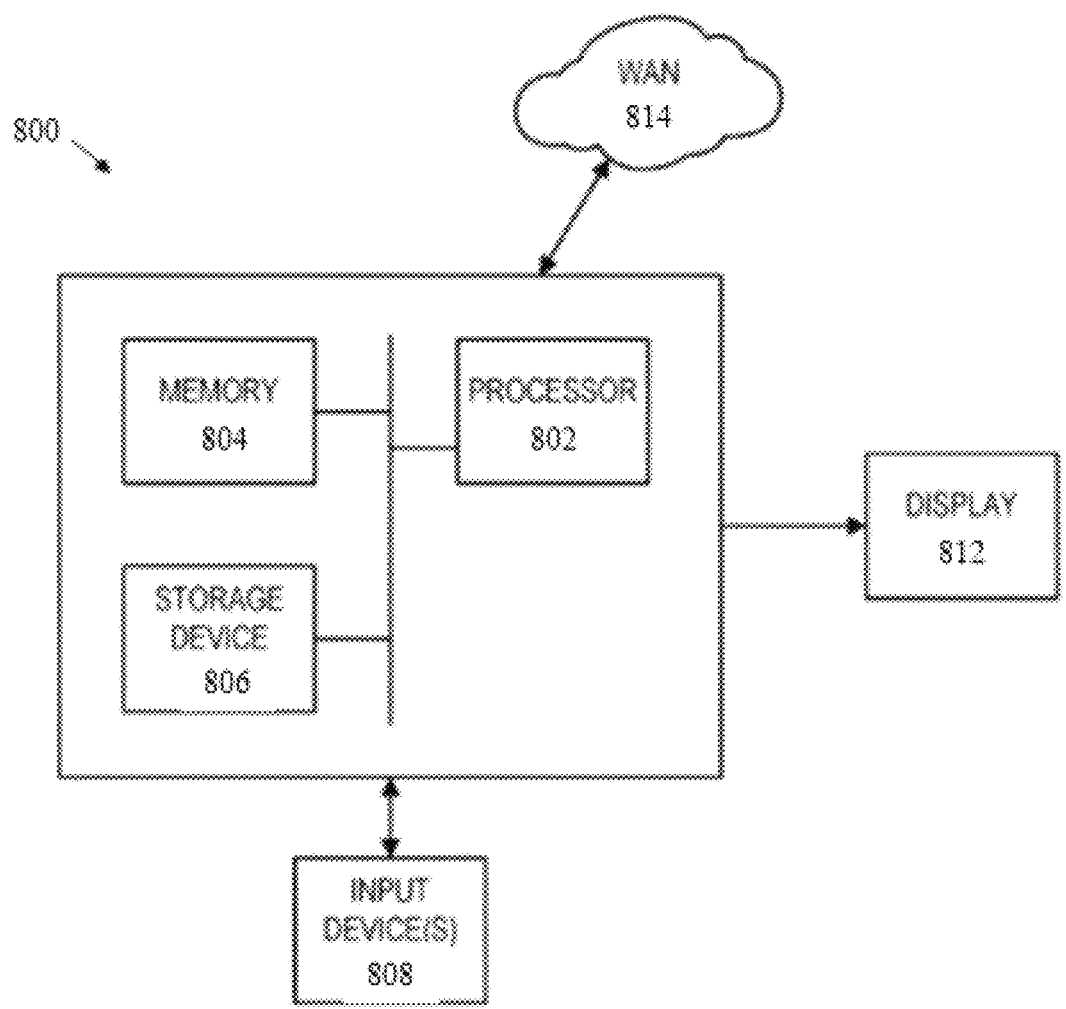
FIG. 8 shows a diagram of an example computer system for executing a water flow characterization system, in accordance with disclosed aspects.

One or more aspects described herein may be implemented on virtually any type of computer regardless of the platform being used. For example, as shown in FIG. 8, a computer system 800 includes a processor 802, associated memory 804, a storage device 806, and numerous other elements and functionalities typical of today's computers (not shown). The computer 800 may also include input means 808, such as a keyboard and a mouse, and output means 812, such as a monitor or LED. The computer system 800 may be connected to a local area network (LAN) or a wide area network (e.g., the Internet) 814 via a network interface connection (not shown). Those skilled in the art will appreciate that these input and output means may take other forms.

Further, those skilled in the art will appreciate that one or more elements of the aforementioned computer system 800 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device (e.g., a non-transitory computer-readable medium or device).

Systems and methods for 3D reconstruction and georegistration of points/point cloud data for analyzing water flow have been described. Although particular embodiments, aspects, and features have been described and illustrated, one skilled in the art would readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A method for characterizing a water flow, the method comprising:
   receiving, by a computing device, a first set of one or more images captured by a first camera and a second set of one or more images captured by a second camera, wherein a first position of the first camera is fixed relative to a first position of the second camera;
   progressively tracking one or more features across a decreasing scale of tiled sets of one or more of the images;
   generating point data for each of the one or more tracked features based on a coordinate system relative to the first camera or the second camera;
   transforming the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device is configured to provide a geolocation of the origin of the first GPS device;
   generating, based on the transformed point data, a geodetic mapping function;
   determining, based on the geodetic mapping function, georegistered coordinates of the one or more tracked features;
   using the georegistered coordinates of the one or more tracked features to characterize the water flow; and
   performing aquatic operations in the water flow based on the characterization of the water flow.

2. The method of claim 1, wherein transforming the point data to the GPS/INS coordinate system comprises determining an offset between (i) the GPS/INS coordinate system relative to the first camera or the second camera and (ii) physical location of the first GPS device.

3. The method of claim 1, wherein transforming the point data to the GPS/INS coordinate system comprises determining an offset between (i) the GPS/INS coordinate system relative to the first camera or the second camera and (ii) physical location of the INS device.

4. The method of claim 1, wherein the point data corresponds to one or more displacement vectors associated with the one or more tracked features.

5. The method of claim 1, wherein:
   determining the georegistered coordinates of the one or more tracked features comprises determining latitude, longitude, and altitude (LLA) georegistered coordinates of the one or more tracked features, and
   using the georegistered coordinates of the one or more tracked features to characterize the water flow comprises using the LLA georegistered coordinates of the one or more tracked features to characterize the water flow.

6. The method of claim 5, further comprising dynamically updating the determined LLA georegistered coordinates of the one or more tracked features responsive to moving the first camera or the second camera to a respective second position different from the respective first position.

7. The method of claim 5, further comprising determining the LLA georegistered coordinates of the one or more tracked features independent of in situ surveyed ground control points.

8. The method of claim 1, wherein transforming the point data to a GPS/INS coordinate system based on the origin of the first GPS device coupled to the first camera comprises transforming the point data based on latitude, longitude, and altitude (LLA) coordinates associated with the first GPS device.

9. The method of claim 1, further comprising:
   coupling the first camera and the second camera together to form a camera rig system,
   wherein transforming the point data to the GPS/INS coordinate system based on the rotation of the first camera and second camera relative to the first GPS device comprises transforming the point data based on yaw, pitch, and roll coordinates associated with the camera rig system.

10. A system for characterizing a water flow, comprising:
   a first camera configured to capture a first set of one or more images;
   a second camera configured to capture a second set of one or more images, wherein a first position of the first camera is fixed relative to a first position of the second camera; and
   at least one processor configured to:
   progressively track one or more features across a decreasing scale of tiled sets of one or more of the images;
   generate point data for each of the one or more tracked features based on a coordinate system relative to the first camera or the second camera;
   transform the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device is configured to provide a geolocation of the origin of the first GPS device;
   generate, based on the transformed point data, a geodetic mapping function; and
   determine, based on the geodetic mapping function, georegistered coordinates of the one or more tracked features.

11. The system of claim 10, wherein the at least one processor is configured to transform the point data to the GPS/INS coordinate system by determining an offset between (i) the GPS/INS coordinate system relative to the first camera or the second camera and (ii) physical location of the first GPS device.

12. The system of claim 10, wherein the at least one processor is configured to transform the point data to the GPS/INS coordinate system by determining an offset between (i) the GPS/INS coordinate system relative to the first camera or the second camera and (ii) physical location of the INS device.

13. The system of claim 10, wherein the point data corresponds to one or more displacement vectors associated with the one or more tracked features.

14. The system of claim 10, wherein the at least one processor is configured to determine the georegistered coordinates of the one or more tracked features by determining latitude, longitude, and altitude (LLA) georegistered coordinates of the tracked features.

15. The system of claim 14, wherein the at least one processor is configured to dynamically update the determined LLA georegistered coordinates of the one or more tracked features responsive to moving the first camera or the second camera to a respective second position different from the respective first position.

16. The system of claim 14, wherein the at least one processor is configured to determine the LLA georegistered coordinates of the one or more tracked features independent of in situ surveyed ground control points.

17. The system of claim 10, wherein the at least one processor is configured to transform the point data to a GPS/INS coordinate system based on the origin of the first GPS device coupled to the first camera by transforming the point data based on latitude, longitude, and altitude (LLA) coordinates associated with the first GPS device.

18. The system of claim 10, further comprising:
coupling the first camera and the second camera together to form a camera rig system,
wherein the at least one processor is configured to transform the point data to the GPS/INS coordinate system based on the rotation of the first camera and second camera relative to the first GPS device by transforming the point data based on yaw, pitch, and roll coordinates associated with the camera rig system.

19. A non-transitory computer readable medium comprising computer code for characterizing a water flow, the computer code, when executed by a processor, performing steps to:
receive a first set of one or more images captured by a first camera and a second set of one or more images captured by a second camera, wherein a first position of the first camera is fixed relative to a first position of the second camera;
progressively track one or more features across a decreasing scale of tiled sets of one or more of the images;
generate point data for each of the one or more tracked features based on a coordinate system relative to the first camera or the second camera;
transform the point data to a Global Positioning System/Inertial Navigation System (GPS/INS) coordinate system based on (1) an origin of a first GPS device coupled to the first camera and (2) a rotation of the first camera relative to an INS device coupled to the first camera, wherein the first GPS device is configured to provide a geolocation of the origin of the first GPS device;
generate, based on the transformed point data, a geodetic mapping function;
determine, based on the geodetic mapping function, georegistered coordinates of the one or more tracked features; and
use the georegistered coordinates of the one or more tracked features to characterize the water flow, wherein aquatic operations are performed in the water flow based on the characterization of the water flow.

20. The non-transitory computer readable medium of claim 19, wherein transforming the point data to a GPS/INS coordinate system based on the origin of the first GPS device coupled to the first camera comprises transforming the point data based on latitutde, longitude, and altitude (LLA) coordinates associated with the first GPS device.

* * * * *